April 25, 1939.  H. S. THOMAS  2,155,960
SCUM REMOVER
Filed May 11, 1937
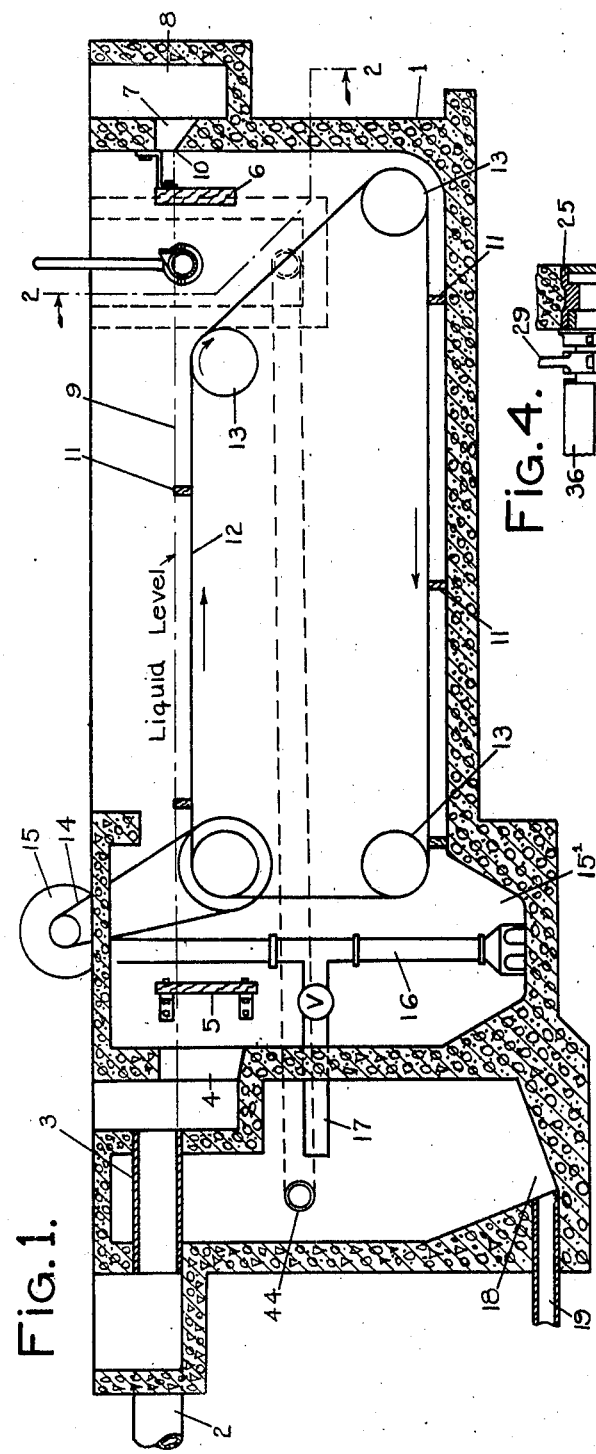
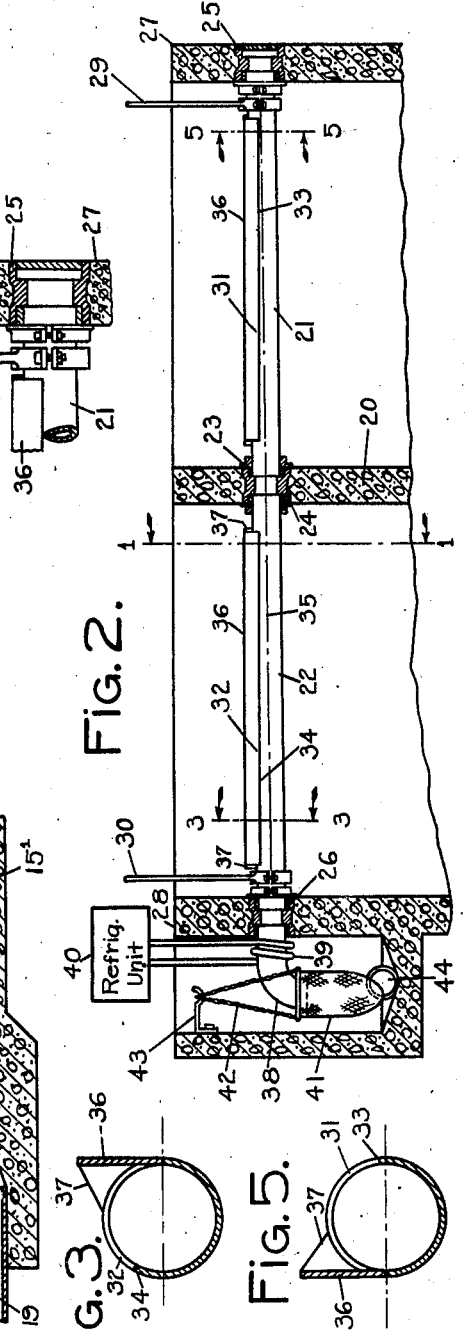
INVENTOR
H. S. Thomas
BY Stuart J. Mackey
his ATTORNEY Patented Apr. 25, 1939

2,155,960

UNITED STATES PATENT OFFICE 2,155,960

SCUM REMOVER

Howard S. Thomas, Rochester, N. Y.

Application May 11, 1937, Serial No. 141,995

5 Claims. (Cl. 210—3)

This invention relates, in general, to apparatus employed in sewage disposal plants, and has more particular reference to an improved means for removing the scum from sewage as its flows through a primary sedimentation tank of a disposal plant of the character referred to.

In the treatment of sewage, whether it be by the "activated sludge" process, or by simple sedimentation, or otherwise; it is usual to first pass the raw sewage through a primary settling tank, before it passes to further treatment. In order to facilitate the subsequent treatment, and not interfere therewith, including the usual final step of filtration, prior to broad irrigation, or incineration, or the like; it is desirable to remove, as far as possible, the scum; that is, the solid parts that are lighter than the carrying liquid, and hence float on top of the liquid.

With the above in mind, it is proposed, in accordance with this invention, to provide a simple, economical, and efficient means for removing the scum, including the associated grease, oils, and fats; from the sewage as it passes through the primary tank.

More specifically, it is proposed to pivot, across the tank at right angles to the direction of flow of liquids, a pipe or tube, having a slot longitudinally formed therein, with the forward edge of the slot rounded, and parallel with the liquid surface, and with the pipe tilted or inclined to the liquid surface; a strainer bag being carried near one end of the pipe, and a cooling coil being placed near the exit end of the pipe, in order to cool and congeal the fats, greases, and oils, so that they can be caught in the strainer bag with the solids.

Further objects, purposes, and characteristic features of the present invention will appear as the description progresses; reference being made to the accompanying drawing, showing, in a diagrammatic form, and in no manner, whatsoever, in a limiting sense, one specific form which the invention can assume.

In the drawing:

Fig. 1 is a sectional elevation, of one form of the invention, taken on line 1—1 of Fig. 2, and viewed in the direction of the arrows.

Fig. 2 is a sectional elevation, of the invention, taken on line 2—2 of Fig. 1, and viewed in the direction of the arrows.

Fig. 3 is a fragmentary sectional view, on line 3—3 of Fig. 2, and viewed in the direction of the arrows.

Fig. 4 is an enlarged fragmentary view of a detail of Fig. 2.

Fig. 5 is a fragmentary sectional view, on line 5—5 of Fig. 2, and viewed in the direction of the arrows.

Referring now to the drawing, there is shown a primary tank 1, having an inlet pipe 2, for the reception of the incoming raw sewage. This sewage flows through a pipe 3, and a wall opening 4, to strike a baffle plate 5; thence to flow toward the other end of tank 1, passing under a baffle plate 6 through a wall opening 7, to an outlet channel 8. The liquid assumes a level as indicated at 9, and as determined by the tip 10 of outlet 7. In its flow through the tank, the heavier solids settle to the bottom of the tank, to be scraped therefrom by scrapers 11, carried on a belt 12, operated, as by wheels 13, driven, for example, by a belt 14, from a motor 15.

These heavier solids, forming the raw sludge, is received in a sump 15¹, from whence it is pumped, through a pipe 16, past a valve V in pipe 17, to an outer chamber 18, from which it is pumped, through pipe 19, to a suitable storage chamber. In one form of treatment, this storage chamber can be a thickener chamber, the raw sludge being treated with lime, or the like, until it is convenient to filter it; as in vacuum filters.

As explained above, a considerable portion of the solid matter in the incoming sewage, floats on the liquid surface, constituting the scum.

The tank, as shown in Fig. 2, has a longitudinal partition wall 20, extending the depth of the tank to, in effect, separate the tank into two elongated tanks, extending side by side, there being a scraper belt 12 in each of these tank portions.

Extending across the tank, near the exit end thereof, and transversely of the tank, are two scum remover pipes 21 and 22, the two pipes being positioned in line. One end of each pipe is rockably supported in its bearing, as 23 and 24, carried by the partition wall 20, the bearings being suitably supported in the concrete or like material of which the tanks can be constructed. The other ends of pipes 21 and 22 are carried, respectively, by bearings 25 and 26 in the two outside walls, 27 and 28, of the tank.

Attached, one to each outer end of each of the pipes 21 and 22, are operating handles 29 and 30, which are clamped or otherwise adjustably attached thereto.

With the bearings 23 and 24 positioned in line, the two pipes 21 and 22 are positioned in line and functionally constitute a single stretch of pipe, spanning the tank side walls. In each of the pipes 21 and 22, is a longitudinal slot, 31 and 32, having forward edges 33 and 34, which are accurately rounded and smoothed to facilitate flow of matter thereover. The edges of these slots are in line, and shown in Figs. 1 and 2, are exactly parallel with the liquid level, i. e., they are in a horizontal line. The two pipes 21 and 22, however, are positioned in their bearings to be inclined to the horizontal, and to slope downwardly from right to left, as viewed in Fig. 2. This slope of the pipes can be seen by noting the manner in which the center line 35 of the pipes diverges from the slot edges 33 and 34.

At the far side of each pipe 21 and 22, is attached an upstanding baffle plate 36, welded or otherwise attached in place, with a closing side wing 37 at each end of each baffle 36.

From Figs. 3 and 5 it can be clearly seen that the slots taper, from a point at the right end that is practically at the center line, to a point at the left end that is above the center line by about a quarter of the diameter of the pipe.

At the lower end of the pipe 22, where it terminates in the tank wall 28, is an elbow 38, continuing the pipe, and about one part thereof is a cooling coil 39, connected to a cooling unit 40, of any desired character, for supplying the coil 39 with cooling fluid sufficient to congeal greases, oils, fats, and the like.

The outer end of the elbow 38 is received in a strainer bag 41, carried by a chain 42, supported by a hook 43. The liquid that passes through bag 41, passes through a pipe 44, and into the chamber 18, there to mix with the raw sludge. The bag 41 can be emptied, from time to time, and the contents suitably disposed of.

In operation, the apparatus, as above described, functions to remove practically all of the scum and grease, in a simple and economical manner. The pipes 21 and 22 can be rocked by their handles 29 and 30, to dip the forward rounded edges of their slots, more or less into the liquid, or raise them out of the liquid entirely, as occasion may demand, the baffles 36 extending a sufficient distance above the liquid level to positively prevent any scum from passing beyond the pipes to the outlet baffle 6.

The scum, as it flows over the slot edges, and into the pipes, flows by gravity along the pipes to the lower end, and past the cooling coils 39, into the bag 41.

The slots can, of course, be sloped a greater amount to the pipe center line, if desired, and the pipe can be varied in diameter to accommodate it to the conditions encountered. In any event, the parts are so proportioned, that the scum flows readily through the pipes, and into the bag, and the coils 39 are so proportioned as to solidify all oil and grease and fat, so that the subsequent filtering operations are not interfered with by such oils, fats and greases.

With the arrangement as shown, a tank of any width can be readily equipped with the scum remover; the separate pipe sections being made short enough to facilitate and make practical, the rocking of each pipe section by its handle, and all the pipe sections, more than two in number, if desired, are lined up to, in effect, form a single continuous pipe, from end to end, with nothing obstructing the free flow of liquid therethrough.

The above rather specific description of one form of my invention, is given wholly by way of example, and is not intended, in any manner whatsoever, in a limiting sense. It is intended that this application shall cover all such modifications, adaptations, and equivalents, as come within the spirit and scope of the present invention, as defined by the appended claims.

Having described my invention, I now claim:

1. In a sewage disposal plant, in combination with a settling tank through which sewage passes from end to end, a scum remover comprising a tube near the exit end of the tank and extending across the tank at substantially right angles to the direction of flow, and substantially at the liquid level, a bearing at each end of the tube rockingly supporting the tube, means for rocking the tube in its bearings, an opening in the tube to permit entrance of scum thereinto, the tube being inclined to the horizontal from end to end, a discharge nozzle at the lower end of the tube, and a cooling coil positioned around the nozzle to congeal fats and greases in the liquid flowing therethrough under the force of gravity.

2. In a sewage disposal plant, in combination with a settling tank through which sewage passes from end to end, a scum remover comprising a tube near the exit end of the tank and extending across the tank and at substantially right angles to the direction of flow, and substantially at the liquid level, a bearing at each end of the tube rockingly supporting the tube, means for rocking the tube in its bearings, an opening in the tube to permit entrance of scum thereinto, the tube being inclined to the horizontal from end to end, an outlet nozzle at the lower end of the tube, a cooling coil positioned around the nozzle to congeal fats and greases in the liquid flowing under the force of gravity from the lower end of the tube, and a strainer bag positioned to receive the liquid after it has passed beyond the cooling coil.

3. In a sewage disposal plant, in combination with a settling tank through which sewage is conducted from one end to the other, a scum remover comprising a tube extending across the tank and at right angles to the liquid flow, a bearing at each end of the tube supporting it substantially at the liquid level, the tube sloping to the horizontal from one end to the other, an elongated, longitudinal slot extending substantially the entire length of the tube and having its forward edge, considered in the direction of liquid flow, positioned accurately parallel with the liquid level, means for rocking the tube in its bearings to vary the elevation of the forward edge of the slot, in a direction at right angles to the horizontal, with respect to the liquid level, an outlet nozzle at the lower end of the tube, a readily accessible strainer bag positioned to receive the scum flowing from the nozzle, and means carried by the nozzle for cooling the liquid flowing therethrough for thereby congealing the fats and greases.

4. In combination, in a sewage settling tank, a tube extending across the tank, end bearings rockably supporting the tube substantially at the liquid level, means for rocking the tube in its bearings about its longitudinal axis, the tube being positioned to slope from end to end with respect to the horizontal, in a single, longitudinal elongated slot in the tube extending from substantially the longitudinal center line of the tube at one end, to substantially half way between this center line and the top of the tube at the other end, the tube being positioned so that the forward edge of said slot is accurately horizontal.

5. In combination, in a sewage settling tank, a scum remover comprising a plurality of separate lengths of tube, each length of tube having a bearing at each end rockably supporting it substantially at the liquid level, an opening in each length of tube for the inflow of scum, means for rocking each length of tube to variously position its opening with reference to the liquid level, the lengths of tube being accurately in line each with all the other lengths, and the bearings and interconnection portions thereof having their inner faces smooth, and in line with, the inner faces of the lengths of tube, whereby to form a continuous smooth conduit for the flow of scum through the plurality of lengths of tube.

HOWARD S. THOMAS.